United States Patent [19]

Matsuta et al.

[11] Patent Number: 4,979,052
[45] Date of Patent: Dec. 18, 1990

[54] DIGITAL SIGNAL MAGNETIC RECORDING/REPRODUCING APPARATUS

[75] Inventors: Toyohiko Matsuta; Masafumi Shimotashiro, both of Neyagawa; Masaaki Kobayashi, Kawanishi, all of Japan

[73] Assignee: Matsushita Electric Industrial Co., Ltd., Osaka, Japan

[21] Appl. No.: 251,094

[22] Filed: Sept. 29, 1988

[30] Foreign Application Priority Data

Sep. 29, 1987 [JP] Japan .................................. 62-245126
Oct. 12, 1987 [JP] Japan .................................. 62-256536
Dec. 17, 1987 [JP] Japan .................................. 62-319401

[51] Int. Cl.[5] ........................... G11B 5/00; G11B 5/09
[52] U.S. Cl. ........................................ 360/32; 360/40
[58] Field of Search .............................. 360/46, 32, 67; 358/335

[56] References Cited

U.S. PATENT DOCUMENTS 4,633,330 12/1986 Yamamitsu et al. .
4,864,421 9/1989 Morioka et al. ..................... 358/335

OTHER PUBLICATIONS

"An Experimental Digital Video Recording System", L. Driessen, Cr 21, IEEE Transactions on Consumer Electronics, vol. CE-32, #3, 8/86.
"An Experimental Digital VTR Capable of 12-Hour Recording" by C. Yamamitsu, A. Ide, T. Juri in IEEE Transactions on Consumer Electronics, vol. CE-33, No. 3, Aug., 1987.
"Digital Television Recording with Low Tape Consumption" by John L. E. Baldwin, copyright 1978, 1979 by the Institution of Electrical Engineers.
"Signal System Design for a Digital Video Recording System" by Luigi Gallo in SMPTE Journal, vol. 86, Oct., 1977.
"An Analytical Approach to the Standardization of Digital Videotape Records" by Jurgen K. R. Heitmann, SMPTE Journal, Mar., 1982.
"Digital Video Recording: New Results in Channel Coding and Error Protection" by Jurgen K. R. Heitmann, in SMPTE Journal, Feb., 1984.

Primary Examiner—Vincent P. Canney
Attorney, Agent, or Firm—Wenderoth, Lind & Ponack

[57] ABSTRACT

A digital signal magnetic recording/reproducing apparatus converts a digital signal into a multi-value quadrature amplitude modulated signal, and records and reproduces the multi-value quadrature amplitude modulated signal. By using the multi-value quadrture amplitude modulation, any DC component in the recording signal is removed and utilization efficiency of the recording frequency band can be improved. By bias recording of the multi-value quadrature amplitude modulated signal, non-linearity of the electromagnetic of conversion system is reduced, and deterioration of SN ratio due to distortion is improved.

10 Claims, 6 Drawing Sheets

DIGITAL SIGNAL MAGNETIC RECORDING/REPRODUCING APPARATUS

BACKGROUND OF THE INVENTION

1. Field of the Invention

This invention relates to a digital signal magnetic recording/reproducing apparatus such as a digital video tape recorder (DVTR), etc.

2. Description of the Prior Art

Conventional digital signal magnetic recording/reproducing systems, due to difficulties in recording and reproducing DC components, employ baseband modulation using NRZ codes (for instance, J. K. R. Heitmann, "An Analytical Approach to the Standardization of Digital Videotape Recorder", SMPTE J., 91,3, Mar. 1982 or J. K. R. Heitmann, "Digital Video Recording, New Result in Channel Coding and Error Protection", SMPTE J., 93:140-144, Feb. 1984), 8-10 block codes (for example, J. L. E. Baldwin, "Digital Television Recording with Low Tape Consumption", SMPTE J., 88:490-492, July 1979), Miller-square ($M^2$) Codes (for instance, L. Gallo, "Signal System Design for a Digital Video Recording System", SMPTE J., 86:749-756, Oct. 1977), and ternary partial response systems.

However, with digital signal magnetic recording/reproducing systems using such baseband modulation, since signals handled are basically binary signals, the utilization efficiency of the recording frequency band (pit rate transmittable in a unit band) is low. For instance, assuming the roll off rate of the transmission system to be 0.5, the utilization efficiency of the frequency band is at most 1.33 bits/sec/Hz.

Therefore, tape consumption increases, that is, a large amount of information recording is difficult. In order to increase the recording rate, methods of expanding the recording band, increasing the number of recording channels, or increasing the relative speed have been considered. However, when the recording band is widened, the SN ratio significantly decreases and therefore the recording rate cannot be increased very much. When the number of recording channels is increased, the track width becomes narrow and the SN ratio decreases. By increasing the relative speed, the tape consumption becomes a problem naturally. (For instance, L. M. H. Dreissen et al, "An Experimental Digital Video Recording System", IEEE Trans. on CE, CE-32 No. 3, pp 362-371, Aug. 1986 or C. Yamamitsu et al, "An Experimental Digital VTR Capable of 12-hour Recording", IEEE Trans. on CE, CE-33, No. 3, pp 240-248, 1987).

SUMMARY OF THE INVENTION

An object of this invention is to provide a new type digital magnetic recording/reproducing apparatus with higher frequency utilization efficiency, and higher recording rate than the conventional digital magnetic recording/reproducing systems using baseband modulation.

In order to attain the above object, a digital magnetic recording/reproducing apparatus according to this invention comprises: an encoder for encoding an input digital signal into multi-value digital signals; a carrier wave generating circuit for generating a carrier wave; a multi-value quadrature amplitude modulator ("modulator" hereinafter) for quadrature binary modulation of the output of the encoder using the carrier wave; a bias circuit for adding a bias signal to the output of the modulator; a magnetic recording/reproducing unit for recording the output of the bias circuit on a magnetic recording medium and reproducing the recorded signal; a carrier wave reproducing circuit for for reproducing the carrier wave from the reproduced signal; a demodulator for demodulating the reproduced signal using the reproduced carrier wave; and a decoder for decoding the output of the demodulator to obtain a reproduced digital signal.

By the above composition, any DC component in the recording signal can be completely removed. With the use of the multi-value quadrature amplitude modulation, which has a high frequency utilization efficiency, a frequency band with good CN ratio of the electromagnetic converting system can be used. By widening the frequency band to the extent that the SN ratio or BER (Bit Error Rate) is in an allowable range, an increase of the recording rate compared with baseband modulation is possible. Since bias recording is used, non-linearity in the electromagnetic converting system can be decreased and deterioration of the SN ratio due to distortion of signals caused by the non-linearity of the electromagnetic converting system can be decreased.

DESCRIPTION OF THE PREFERRED EMBODIMENTS

Figure 1:
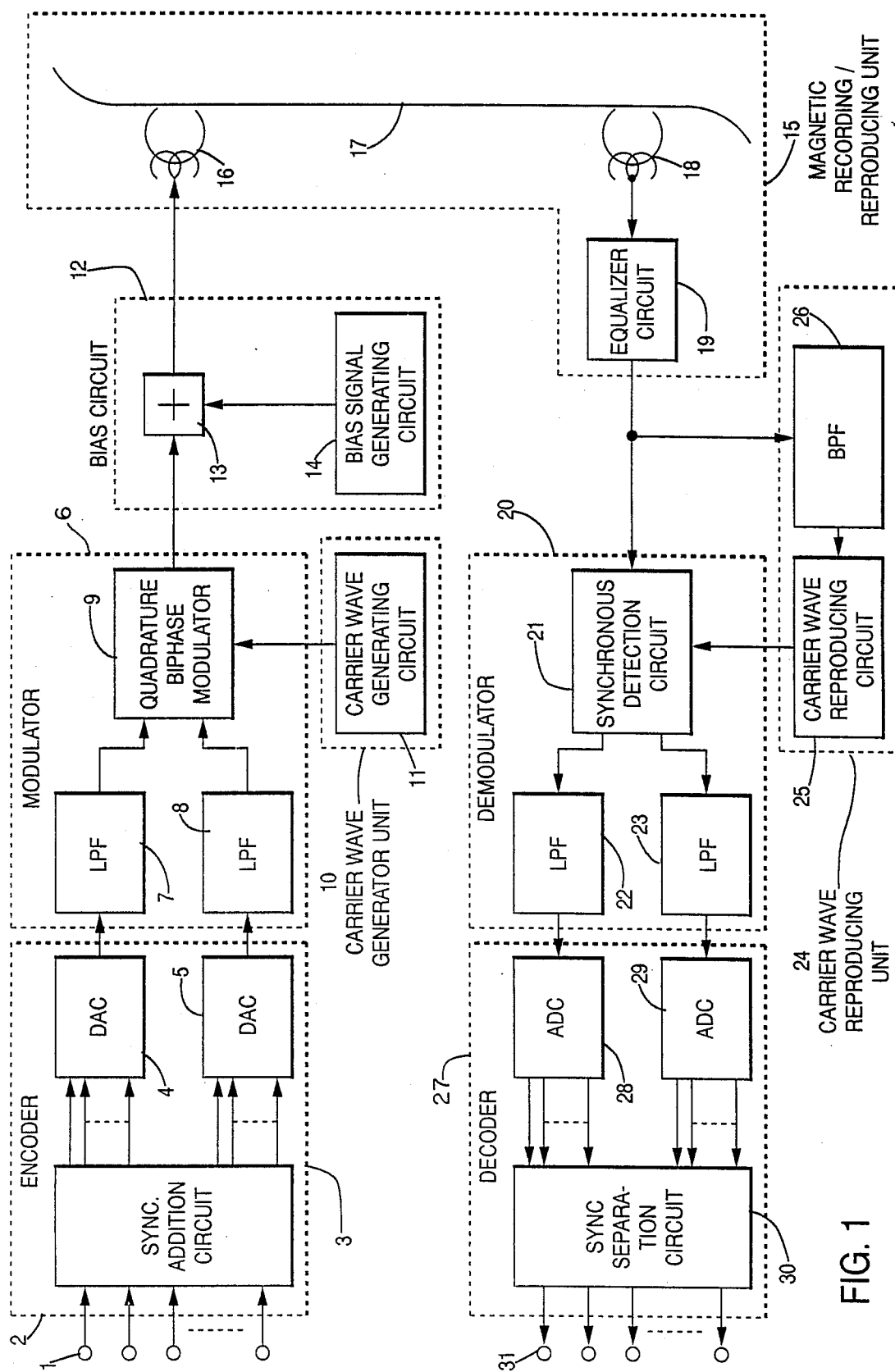
FIG. 1 is a block diagram of a digital signal magnetic recording/reproducing apparatus of the first embodiment according to this invention.
Figure 2:
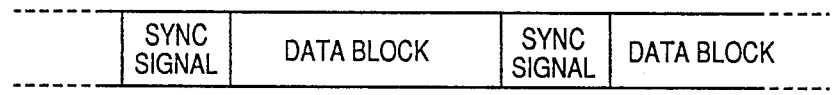
FIG. 2 is a conceptional signal format of the output signal from a synchronous addition circuit 3 of the digital signal magnetic recording/reproducing apparatus shown in FIG. 1.

FIG. 1 shows a block diagram of a digital signal magnetic recording/reproducing apparatus of the first embodiment according to this invention. A digital signal converted from a TV signal or audio signal is inputted to an input terminal 1. The digital signal inputted to the input terminal 1 is fed to an encoder 2. In the encoder 2, the input digital signal is divided into block data each having, for example, 1 horizontal line data in a synchronous addition circuit 3 and a synchronous signal is added before to the head of each data block. As an actual example of the synchronous addition, the synchronous signal is added in the horizontal synchronous period in the data block or the synchronous signal is added before each data block after time-compressing the data block. A conceptional signal diagram of the output of the synchronous addition circuit 3 is shown in FIG. 2.

The digital signal added to the synchronous signal is divided into two parts such as an upper bit part and a lower bit part, which are inputted to digital-analog converters (DACs) 4 and 5, respectively, and converted into multi-value digital signals with multiple levels in the amplitude direction. For instance, when the input digital signal is a 4-bit data signal, it is divided into upper and lower two-bit data, which are converted by the DACs 4 and 5 to two signals each having one of four levels (expressed by 2 bits).

Outputs of the DACs 4 and 5 are fed to the modulator 6. In the modulator 6, the outputs of DAC 4 and 5 are inputted to low-pass filters (LPFs) 7 and 8 respectively and subjected to band restriction. The outputs of LPFs 7 and 8 are inputted to a quadrature biphase modulator 9 for quadrature biphase modulation using a carrier wave outputted from a carrier wave generator 11 in a carrier wave generator unit 10 (in the first embodiment, the carrier wave generator unit 10 and the carrier wave generator 11 are the same).

Figure 4A:
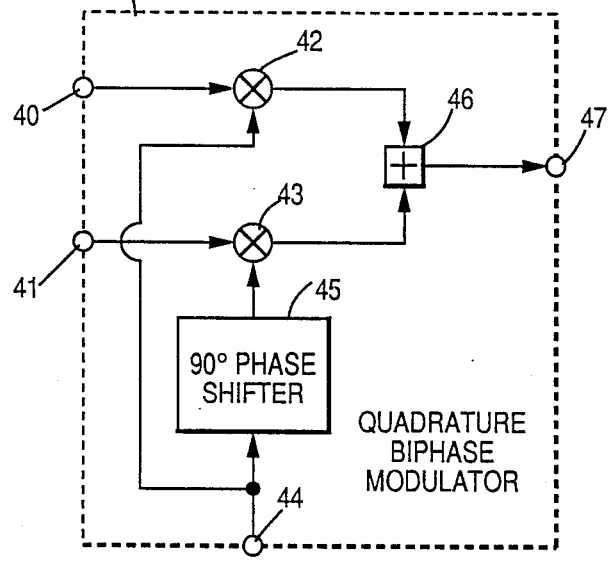
FIGS. 4(A) and (B) are block diagrams of the quadrature biphase modulator 9 and synchronous detection circuit 21 of the digital signal magnetic recording/reproducing apparatus shown in FIG. 1.
Figure 4B:
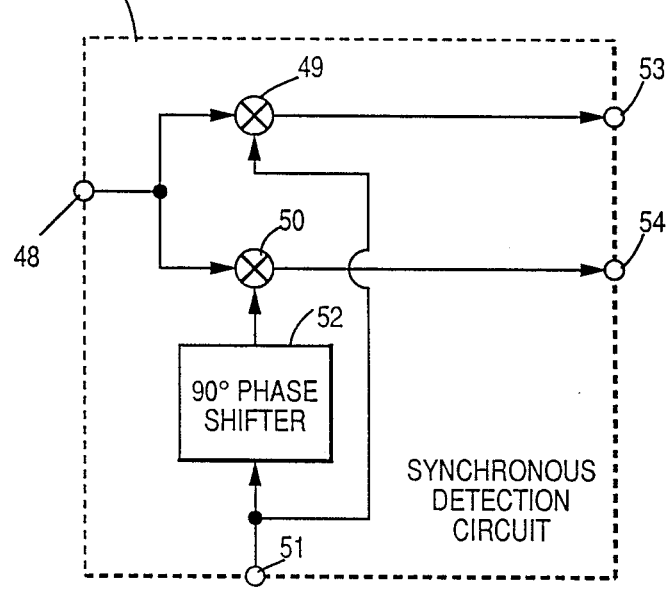

An exemplary block diagram of the guadrature biphase modulator is shown in FIG. 4 (A). The output from the carrier wave generator 11 is expressed by $C(t) = A \cdot \cos \omega_c t$ and the outputs from LPFs 7 and 8 are expressed by d1 (t) and d2 (t). Signals d1 (t) and d2 (t) are multi-value digital signals each with one of n levels (n is any integer). If the number of input bits of the encoder 2 is 4, then the output of each of LPFs 7 and 8 is a 4-value digital signal with one of 4 levels of, for example, 1, 0.5, −0.5, and −1. The outputs d1 (t) and d2 (t) of LPFs 7 and 8 are inputted into balanced modulators 42 and 43 through terminals 40 and 41 respectively. Carrier wave c (t), inputted through a terminal 44, is fed to the balanced modulator 42, and on the other hand is shifted by 90° in phase in a 90° phase shifter 45 and is fed to the balanced modulator 43 as $A \cdot \sin \omega_c t$. In the balanced modulators 42 and 43, the LPF outputs and the carrier waves are multiplied respectively and the results are fed to an adder 46. The output of the adder 46 is outputted from a terminal 47 as an output S (t) of the quadrature biphase modulator 9. In other words, the following equation is obtained:

$$S(t) = d1(t) \cdot A \cos \omega_c t + d2(t) \cdot A \sin \omega_c t$$

However, during the period of the synchronous signal, the signals d1 (t) and d2 (t) do not change, and only the carrier wave is outputted from the modulator 9. For instance, when d1 (t) and d2 (t) in the synchoronous signal period are d1 (t)=1 and d2 (t)=0, S (t)=A.cos ωct is obtained. The output from quadrature binary modulator 9 is fed to a bias circuit 12, and added to a bias signal outputted from a bias signal generating circuit 14 by an adder 13. The bias signal frequency fB is:

$$f_B \geq 3 \cdot f_H$$

where fH is the highest frequency of the recording signal band.

Figure 3:
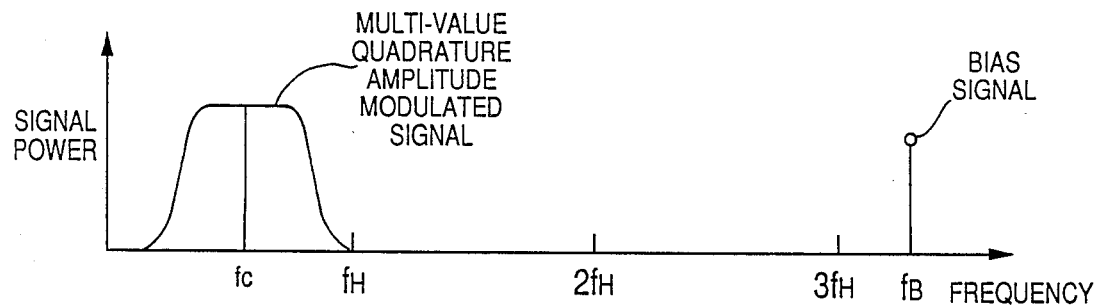
FIG. 3 is a conceptional diagram of the frequency spectrum at the time of recording in the digital signal magnetic recording/reproducing apparatus shown in FIG. 1.
Figure 6A:
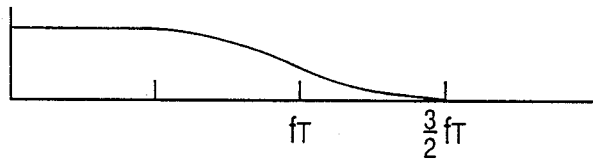
FIGS. 6(a)-(d) are frequency spectrum diagrams of the digital signal magnetic recording/reproducing apparatus shown in FIG. 5.
Figure 6B:
Figure 6C:
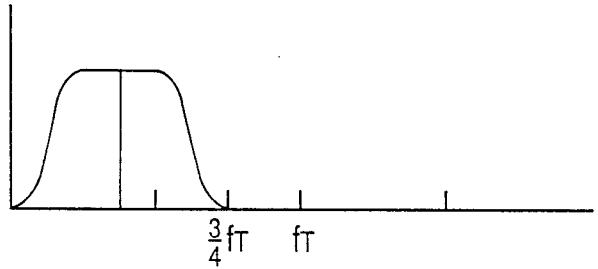
Figure 6D:
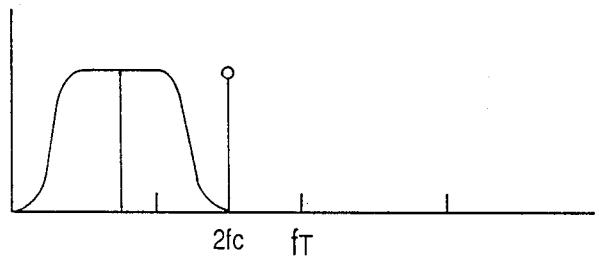

This relationship is shown in FIG. 3. From this relationship, cross modulation component of fB−2f does not enter the recording signal band (here, f is any frequency in the recording signal band). The bias current is determined such that the total SN ratio of the SN ratio of the band used and the SN ratio due to distortion remaining in the band (power of the distortion is considered to be noise) is the maximized. The linearity of the electromagnetic conversion system becomes better by increasing the bias current, but the frequency characteristic is deteriorated and the SN ratio become worse. Therefore, an optimum value of the bias current exists. The output of the bias circuit 12 is fed to a magnetic recording/reproducing unit 15 and recorded on a magnetic recording medium (such as a magnetic tape or a magnetic disk) 17 by a recording head 16.

The signal recorded on the magnetic recording medium 17 is reproduced by a reproducing head 18 (the recording head and the reproducing head may be the same) and inputted to an equalizer circuit 19 which is free from group delay distortion. High frequency components which have been deteriorated by the magnetic recording and reproducing are emphasized by the equalizer circuit 19 so that the frequency characteristic of the reproduced signal becomes approximately flat. The output of the equalizer circuit 19 is fed to a demodulator 20 and a carrier wave reproducing unit 24.

In the carrier wave reproducing unit 24, the carrier wave is extracted by a band-pass filter (BPF) which allows the carrier wave frequency to pass therethrough, and fed to a carrier wave reproducing circuit 25. The carrier wave reproducing circuit 25 reproduces the carrier wave synchronized with the phase of the carrier wave existing in the synchronous signal period and outputs it to the demodulator 20.

A synchronous detection circuit 21 in the demodulator 20 synchronously detects the reproduced signal from the equalizer circuit 19 using the carrier wave reproduced by the carrier wave reproducing circuit 25. An exemplary block diagram of the synchronous detection circuit 21 is shown in FIG. 4 (B). The reproduced signal inputted through a terminal 48 is fed to balanced modulators 49 and 50. The reproduced carrier wave from the carrier wave reproducing circuit 25 is inputted through a terminal 51 and fed to the balanced modulator 49, while it is shifted by 90° in phase by a 90° phase shifter 52 and is fed to the balanced modulator 50. The reproduced signal and reproduced carrier waves are multiplied in the balanced modulators 49 and 50 and the results are outputted from terminals 53 and 54 respectively as two outputs of the synchronous detection circuit 21. The two demodulated signals outputted from the synchronous detection circuit 21 are fed to LPFs 22 and 23 which pass therethrough the multi-value baseband signals before modulation. The characteristic of each LPF is set such that the combined characteristic of LPF 7 or 8 in the modulator and LPF 22 or 23 in the demodulator becomes a roll off characteristic free from interference between codes. The outputs of LPFs 22 and 23 are fed to a decoder 27.

In the decoder 27, the outputs of LPFs 22 and 23 are fed to analog-digital converters (ADCs) 28 and 29 and converted into digital signals. The outputs of ADCs 28 and 29 are fed to a synchronous separating circuit 30 where the synchronous signal is removed to obtain a reproduced digital signal. The reproduced digital signal is outputted from an output terminal 31.

As described above, according to the first embodiment, the phase reference of the carrier wave is simply obtained by the synchronous addition circuit 3 to add the synchronous signal to the input digital signal and the carrier wave reproducing unit 24 to adjust the phase of the reproduced carrier wave with the phase of the carrier wave existing in the sychronous signal period as the reference, which makes the reproduction of the carrier wave easier and increases the accuracy of synchronous detection.

Figure 5:
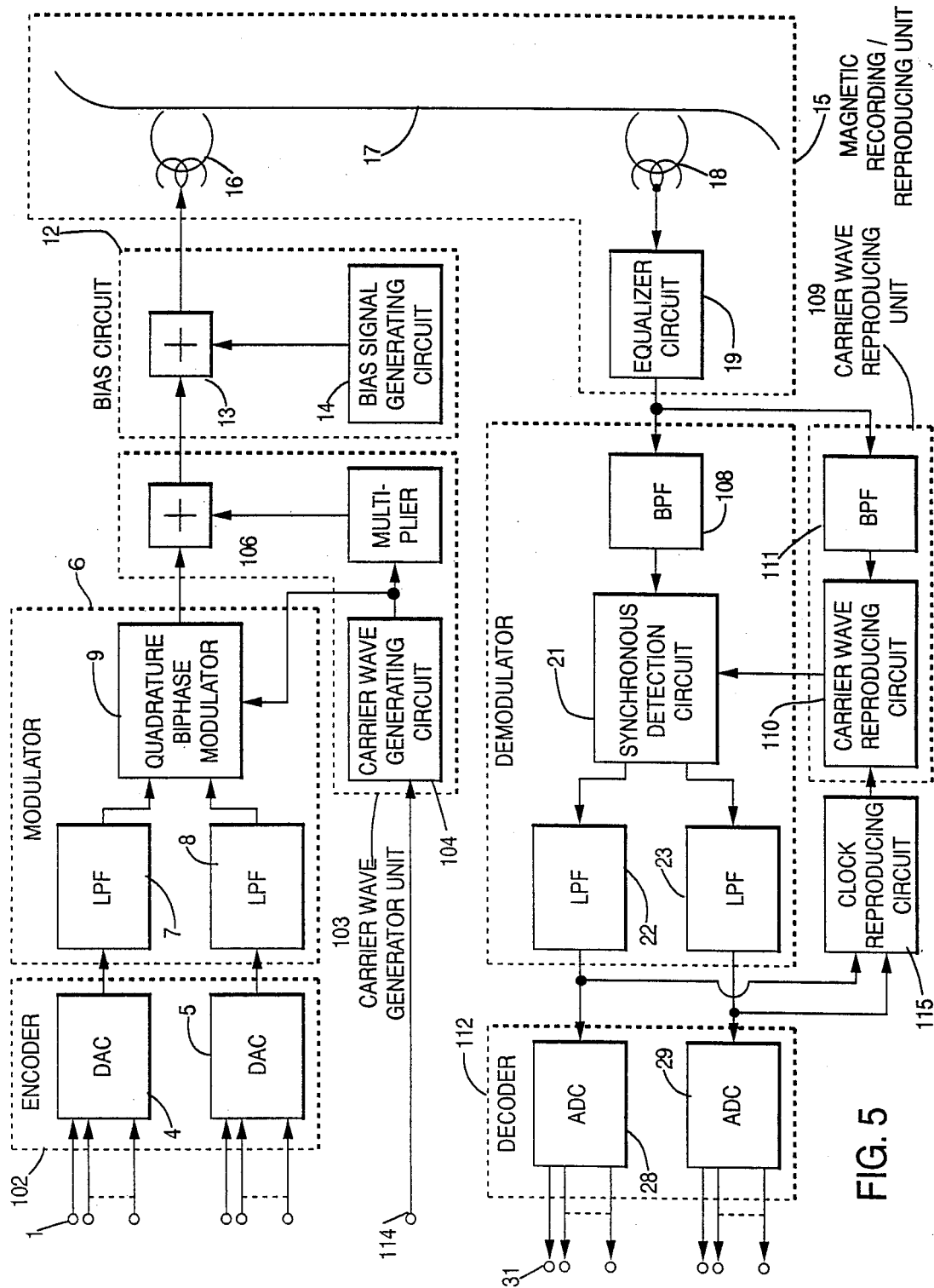
FIG. 5 is a block diagram of a digital signal magnetic recording/reproducing apparatus in the second embodiment according to this invention.

FIG. 5 shows a block diagram of a digital signal magnetic recording/reproducing apparatus of the second embodiment according to this invention. In FIG. 5, differently from the embodiment in FIG. 1, a carrier wave generator 104 generates a carrier wave of the phase adjusted to the clock signal of the input digital signal, the clock signal being inputted from a terminal 114, to simplify the reproduction of the carrier wave. A multiplier 105 multiplies the carrier wave, and an adder 106 adds the modulated signal from the modulator 9 and the output of the multiplier 105 to obtain a frequency multiplexed signal. FIG. 6 (a) is a conceptional diagram of the frequency spectrum when the input digital signal (4-bit signal) is transmitted serially. The input digital signal is input to an encoder 102 and is converted into two multi-level digital signals with multiple levels in the amplitude direction by DACs 4 and 5. The outputs of DACs 4 and 5 are fed to the modulator 6. In the modulator 6, the outputs of DACs 4 and 5 are passed through LPFs 7 and 8 to be subjected to band restriction. FIG. 6 (b) shows a conceptional diagram of the frequency spectrum of the band restricted signal. The outputs of LPF 7 and 8 are fed to the modulator 9 and subjected to quadrature biphase modulation using a carrier wave generated by a carrier wave generator 104 in a carrier wave generator unit 103. FIG. 6 shows a conceptional diagram of the frequency spectrum of the modulated signal.

On the other hand, the output of the carrier wave generator 104 is fed to the multiplier 105, and then fed to the adder 106 as a multiplied carrier wave, which is added to the output of the modulator 9. FIG. 6 (d) is a conceptional diagram of frequency spectrum when the carrier wave is doubled and subjected to frequency multiplexing, where the band is one half that shown in FIG. 6 (a). The output of the adder 106 is fed to the bias circuit 12, where it is added to the bias signal generated by the bias signal generation circuit 14. The output of the bias circuit 12 is fed to the magnetic recording/reproducing unit 15 and recorded on the magnetic recording medium 17 by the recording head 16.

The signal recorded on the magnetic recording medium 17 is reproduced by the reproducing head 18 and fed to the equalizer circuit 19 free from group delay distortion. The high frequency components which have been deteriorated by the magnetic recording and reproduction are raised by the equalizer circuit 19 so that the frequency characteristic after recording and reproducing becomes approximately flat. The output of the equalizer circuit 19 is fed to a demodulator 107 and a carrier wave reproducing unit 109. In the carrier wave reproducing unit 109, the multiplied carrier wave component is extracted by a BPF 111 which allows the frequency of the multiplied carrier wave to pass and is fed to a carrier wave reproducing circuit 110. In the carrier wave reproducing circuit 110, the input signal is frequency-divided, and a carrier wave whose phase is adjusted to that of a reproduced clock signal from a clock reproducing circuit 115 is reproduced and outputted to a demodulator 107. In the demodulator 107, the synchronous detection circuit 21 synchronously detects the reproduced signal which is obtained by passing only the modulated signal component of the output of the equalizer circuit 19 through a BPF 108, using the carrier wave reproduced by the carrier wave reproducing circuit 110. The two demodulated signals which are quadrature signals are fed to LPFs 22 and 23 and only the multi-valve base band components are allowed to pass. The outputs of LPFs 22 and 23 are fed to a decoder 112. The outputs of LPFs 22 and 23, in the decoder 112, are fed to ADCs 28 and 29 and converted to digital signals. The outputs of ADCs 28 and 29 are outputted as a reproduced digital signal from the output terminal 31.

According to the second embodiment as described above, by providing the carrier wave generator 103 which frequency-multiplexes the multiplied carrier wave to the modulated signal, the reproduction of the carrier wave is made easier and the accuracy of the synchronous detection is improved. In the second embodiment, the required SN ratio and linearity are higher than in the first embodiment because of the frequency multiplication, but the recording rate efficiency is increased because there is no synchronous signal period.

Though the multiplication rate of the multiplier 105 was not described in detail for the second embodiment, the multiplication rate may be such that the multiplied frequency is out of the recording signal band.

Figure 7:
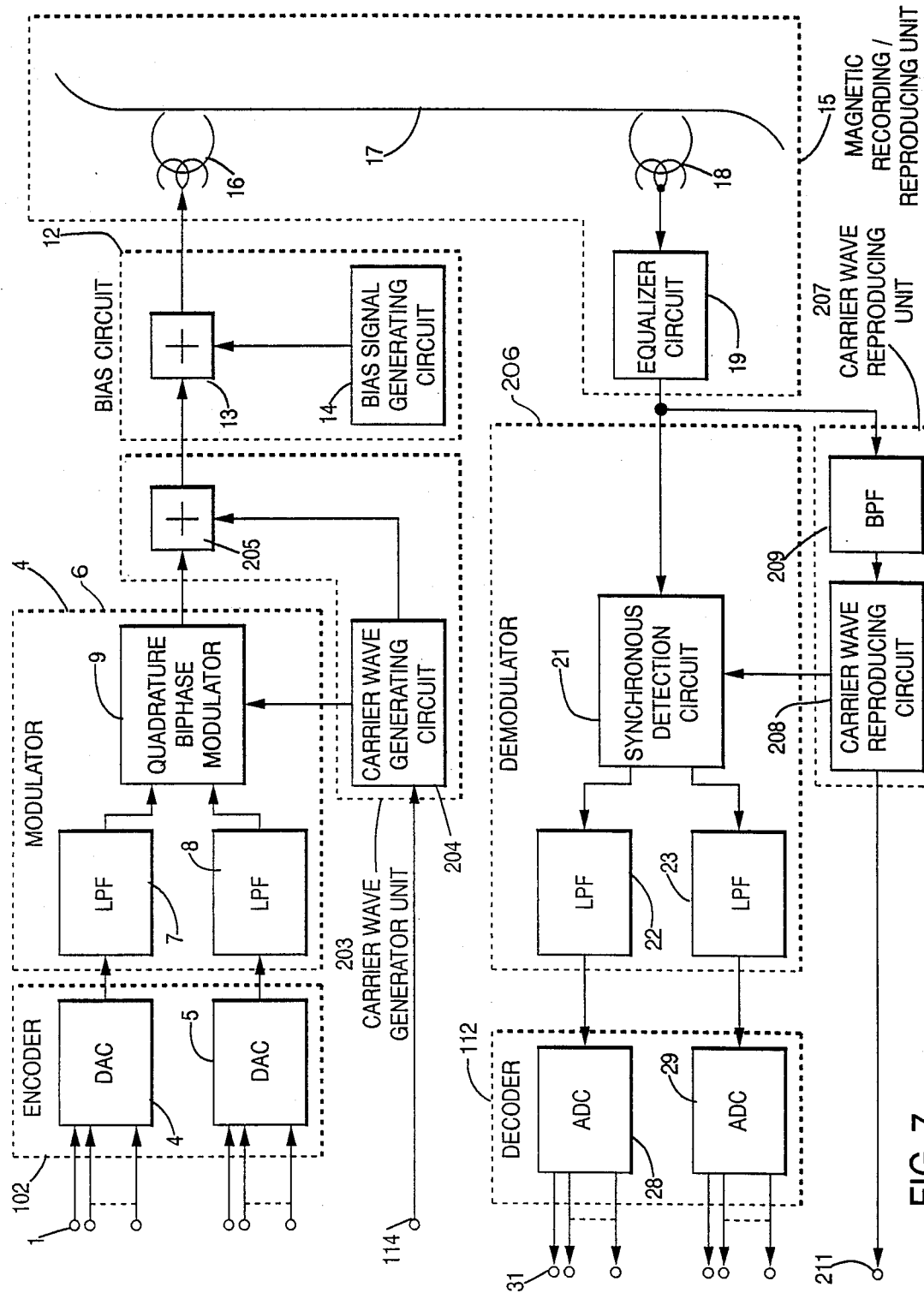
FIG. 7 is a block diagram of a digital signal magnetic recording/reproducing apparatus of the third embodiment according to this invention.

FIG. 7 is a block diagram of a digital signal magnetic recording/reproducing apparatus of the third embodiment according to this invention. In this embodiment, differently from the embodiment in FIG. 1, a carrier wave generator 204 generates a carrier wave and a carrier wave reproducing pilot signal from the clock of the input signal, and an adder 205 frequency-multiplexes the output signal of the modulator 6 and the pilot signal output from the carrier wave generator 204, instead of using the synchronous addition circuit 3.

The input digital signal is fed to the encoder 102 and is converted into multi-value digital signals with multiple levels in an amplitude direction by DACs 4 and 5 in the encoder 102. The outputs of DACs a 4 and 5 are fed to the modulator 6. In the modulator 6, the outputs of the DACs 4 and 5 are passed through LPFs 7 and 8 to be subjected to band restriction.

Figure 8A:
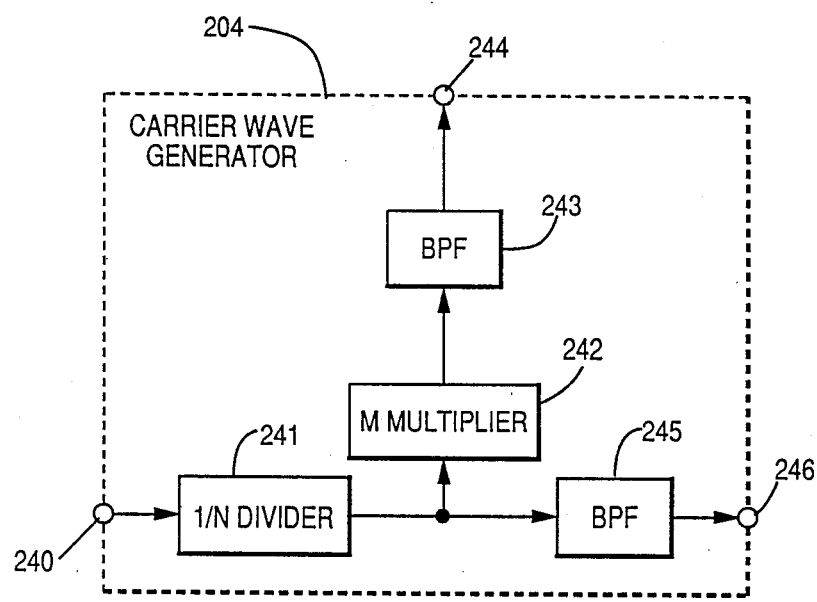
FIGS. 8(A) and (B) are block diagrams of the carrier wave generator 204 and carrier wave reproducing circuit 208 in the digital signal magnetic recording/reproducing apparatus shown in FIG. 7.
Figure 8B:
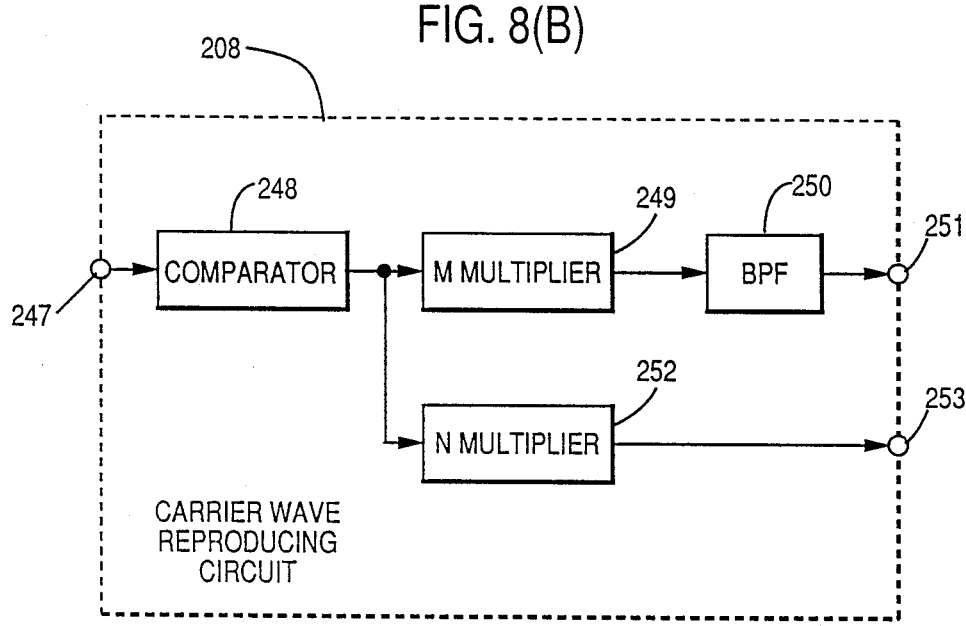

On the other hand, the clock signal inputted through the clock input terminal 114 is fed to a carrier wave generator 204 in a carrier wave generator unit 203. An example of the composition of the carrier wave generator 204 is shown in FIG. 8 (A). The clock signal inputted through an input terminal 240 is frequency-divided to 1/N by a frequency divider 241 and is outputted from an output terminal 246 as a pilot signal through a BPF 245. The output of the frequency divider 241 is fed also to a multiplier 242 and multiplied by M. The output of the multiplier 242 is outputted from an output terminal 244 as a carrier wave through a BPF 243. Here, the frequency fp of the pilot signal and frequency fc of the carrier wave are expressed as shown below:

$$fp = fCLK/N$$

$$fc = M \cdot fp = M/N \cdot fCLK$$

where, M and N are any fixed numbers and fCLK is the clock signal frequency. In order to prevent the pilot signal from entering the band of the modulated signal, the relationship between the carrier frequency fc, baseband W of the multi-value digital signal, and pilot signal frequency fp should be as follows:

fc−W>fp.

The outputs of LPFs 7 and 8 are fed to the quadrature biphase modulator 9 and quadrature-biphase modulated by the carrier wave outputted from the carrier wave generator 204. The pilot signal outputted from the carrier wave generator 204 is fed to an adder 205 and added to the output of the quadrature biphase modulator 9. The output of the adder 205 is fed to the bias circuit 12, added to the bias signal generated by the bias signal generating circuit 14 by the adder 13 and outputted. The output of the bias circuit 12 is fed to the magnetic recording/reproducing unit 15 and recorded on the magnetic recording medium 17 by the recording head 16.

The signal recorded on the magnetic recording medium 17 is reproduced by the reproducing head 18 and fed to the equalizer circuit 19 free from group delay distortion. High frequency components which have been deteriorated by the magnetic recording and reproducing are raised by the equalizer circuit 19 so that the frequency characteristic of the reproduced signals is approximately flat. The output of the equalizer circuit 19 is fed to a demodulator 206 and a carrier wave reproducing unit 207. In the carrier wave reproducing unit 207, the pilot signal is extracted by a BPF 209 which allows only the pilot signal frequency to pass through and fed to a carrier wave reproducing circuit 208. An example of the composition of the carrier wave reproducing circuit 208 is shown in FIG. 8 (B). The pilot signal inputted through an input terminal 247 is fed to a comparator 248 for pulse shaping. The output of the comparator 248 is fed to a multiplier 249, multiplied by M, and outputted from an output terminal 251 after passing through a BPF 250 as a carrier wave. The frequency fCLK of the clock signal and the frequency fc of the carrier wave are described as follows:

$$fCLK = N \cdot fp$$

$$fc = M \cdot fp$$

where, M and N are any fixed numbers and fp is the pilot signal frequency. At this time, the phase relationship between the pilot signal, carrier wave and clock signal should be adjusted to be in the same input/output relationship as that in the carrier wave generator 204.

In the demodulator 206, the synchronous detection circuit 21 synchronously detects the output of the equalizer circuit 19 using the carrier wave reproduced by the carrier wave reproducing circuit 208. The two demodulated signals which are quadrature signals are fed to LPFs 22 and 23 which pass therethrough only the multi-value baseband signals before modulation. The characteristic of each LPF is determined such that the combined characteristic of LPF 7 or 8 in the modulator and LPF22 or 23 in the demodulator becomes a roll off characteristic free from interference between codes. The output (s) of LPFs 22 and and 23 are fed to the decoder 112. In the decoder 112, the outputs of the LPFs 22 and 23 are fed to ADCs 28 and 29 and converted into digital signals. The outputs of ADCs 28 and 29 are outputted from the output terminal 31 as a reproduced digital signal. At the same time, the clock signal is outputted from an output terminal 211.

As described above, according to the third embodiment, by providing the carrier generator 204 to generate the carrier wave and pilot signal from the clock signal, the adder 205 to add the pilot signal to the modulated signal, and the carrier wave reproducing circuit 208 to reproduce the carrier wave and clock signal from the pilot signal, a carrier wave having the phase reference and clock signal can be reproduced.

The relationship $fc = M \cdot fp$ in the example of the composition of the carrier wave generator 204 of the third embodiment may be $fc = M/N \cdot fCLK$ to multiply the clock signal directly by M/N to obtain the carrier wave.

Though not described for the embodiments (first to third) of this invention, by using the method of expanding the convolution code in the amplitude direction as the correction code and decoding using a viterbi demodulator for reproduction at the same time, the required SN ratio can be improved and the utilization efficiency of the recording frequency band can be increased. Though the number of the input bits of DAC was not described in detail, it can be any integer. Using the carrier wave reproduction circuit of the Costas method, etc. at the same time, the reproducing accuracy can be improved. By using a differential-coded digital signal for the input digital signal, the phase correction of carrier wave in the carrier wave reproducing unit becomes simpler.

Regarding the embodiments (from first to third) according to this invention, a case using the multi-value quadrature amplitude modulation (QAM) was described. The same effect can be obtained by other modulation methods such as amplitude phase modulation (APSK), phase modulation (PSK), frequency modulation (FSK), etc.

What is claimed is:

1. A digital signal magnetic recording/reproducing apparatus comprising;
    encoding means for converting an input digital signal into multi-value digital signals;
    carrier wave generating means for generating a carrier wave;
    modulation means for executing a quadrature biphase modulation of an output of said encoding means using the carrier wave to generate a multi-value quadrature amplitude modulated signal;
    magnetic recording and reproducing means for recording the multi-value quadrature amplitude modulated signal on a magnetic recording medium and reproducing the recorded signal;
    carrier wave reproducing means for reproducing the carrier wave from the reproduced signal from said magnetic recording and reproducing means;
    demodulating means for demodulating the reproduced signal from said magnetic recording and reproducing means using the carrier wave reproduced by said carrier wave reproducing means; and
    decoding means for decoding an output of said demodulation means to obtain a reproduced digital signal.

2. A digital signal magnetic recording/reproducing apparatus as in claim 1, further comprising bias means for adding a bias signal to the multi-value quadrature amplitude modulated signal for bias recording.

3. A digital signal magnetic recording/reproducing apparatus as in claim 2, wherein the bias signal frequency is set at least 3 times as high as the maximum frequency of the modulated signal band, and the bias current value is set so that the total SN ratio of the SN ratio of the band using the bias current and the SN ratio due to distortion within the band is maximized.

4. A digital signal magnetic recording/reproducing apparatus as in claim 1, wherein said encoding means has synchronous addition means for adding a synchronous signal to the input digital signal, and said carrier wave reproducing means produces a phase standard of carrier wave in a period in which the synchronous signal is added.

5. A digital signal magnetic recording/reproducing apparatus as in claim 4, wherein said synchronous addition means provides a synchronous signal period and adds a signal indicating the phase standard of carrier wave in the synchronous signal period.

6. A digital signal magnetic recording/reproducing apparatus as in claim 1, wherein said carrier wave generating means multiplies the frequency of the carrier wave and frequency multiplexes the frequency-multiplied carrier wave to the output signal of said modulation means.

7. A digital signal magnetic recording/reproducing apparatus as in claim 6, wherein said carrier wave generating means is provided with a carrier wave generating circuit for generating the carrier wave, a multiplier for multiplying the frequency of the carrier wave, and an adder for adding the multiplied carrier wave to the modulator output signal.

8. A digital signal magnetic recording/reproducing apparatus as in claim 1, wherein said carrier wave generating means comprises a carrier generator for generating the carrier wave and pilot signal from a clock signal, and an adder for adding the output signal of said modulation means to the pilot signal, and wherein said carrier wave reproducing means takes out the pilot signal from the reproduced signal from said magnetic recording and reproducing means and reproduces from the pilot signal the carrier wave and the clock signal.

9. A digital signal magnetic recording/reproducing apparatus as in claim 8, wherein said carrier wave generating means further comprises a frequency divider having a relationship between a frequency fCLK of the clock signal and a frequency fp of the pilot signal which is $fp = fCLK/N$, where N is any constant number, a bandpass filter for passing only the basic frequency component of the pilot signal, a multiplier having a relationship between the frequency fp of the pilot signal outputted from said frequency divider and a frequency fc of the carrier wave which is $fc = M \cdot fp$, where M is any constant number, and a bandpass filter for passing only the carrier wave frequency component.

10. A digital signal magnetic recording/reproducing apparatus as in claim 8, wherein said carrier wave reproducing means further comprises a comparator for converting the input pilot signal into a pulse form, a multiplier having a relationship between a frequency fp of the pilot signal outputted from said comparator and a frequency fc of the carrier wave which is $fc = M \cdot fp$, where M is any constant number, a bandpass filter for passing only the carrier wave frequency component from an output of said multiplier, and a multiplier having a relationship between the frequency fp of the pilot signal outputted from said comparator and a frequency fCLK of the clock signal which is $fCLK = N \cdot fp$, where N is any constant number.

* * * * *